United States Patent [19]

Sheen

[11] Patent Number: 5,251,792
[45] Date of Patent: Oct. 12, 1993

[54] SPRAY BOTTLE WITH CONTROLLABLE SPRAY VOLUME

[76] Inventor: Chung-Shan Sheen, Suite 1, 11F, 95-8 Chang Ping Road, Sec. 1, Taichung, Taiwan

[21] Appl. No.: 951,821

[22] Filed: Sep. 28, 1992

[51] Int. Cl.$^5$ .............................................. B67D 5/06
[52] U.S. Cl. .................................. 222/205; 222/211; 222/356
[58] Field of Search .............. 222/207, 205, 209, 211, 222/356, 434, 438, 453, 522, 526, 537, 583

[56] References Cited

U.S. PATENT DOCUMENTS

| | | | |
|---|---|---|---|
| 2,728,491 | 12/1955 | Aneshansley | 222/526 |
| 3,050,217 | 8/1962 | Mao | 222/537 |
| 4,830,226 | 5/1989 | Kong | 222/207 |
| 5,174,478 | 12/1992 | Reyman | 222/211 |

FOREIGN PATENT DOCUMENTS 1011494  4/1952  France ........................ 222/207

*Primary Examiner*—Andres Kashnikow
*Assistant Examiner*—Philippe Derakshani

[57] ABSTRACT

A spray bottle comprises a resilient transparent bottle having a removable top, a spray tube with an enlarged chamber on a lower end and a nozzle on an upper end, and a check valve on the bottom of the chamber. The chamber is slidingly disposed in a slide cavity within the top member with the spray tube extending through an aperture on an upper side thereof. The chamber is filled with a desired volume of liquid by immersing it to a selected depth in a fluid residing in a lower portion of the bottle, wherein the check valve is opened upon a downward displacement of the chamber. The spray tube is then raised to space the chamber from the surface of the liquid with the check valve acting to retain the quantity of fluid therein. A directional sealing ring disposed around an upper portion of the chamber allows the entry of air into the bottle during the upward displacement. The fluid in the chamber is subsequently discharged through the nozzle by squeezing the bottle.

6 Claims, 5 Drawing Sheets

SPRAY BOTTLE WITH CONTROLLABLE SPRAY VOLUME

BACKGROUND OF THE PRESENT INVENTION

The present invention relates to spray bottles and more particularly to a spray bottle of novel structure that enables the spraying of a controlled volume of liquid.

More conventional spray bottles of the squeeze type generally do not provide any measured control of the spray volume so as to be unsuitable for precise applications or where metered dosages are required, such as in artwork or medicinal usages. Other types of spray bottles having finger operated pumps do provide predetermined spray volumes but are generally non adjustable. Moreover, as the spraying nozzle is usually positioned near the finger actuator of the pump, the spray is usually directed at a right angle with respect to the bottle assembly. This can become problematical as than a sprayed area in a more exacting application may be obscured from view by a user's own hands.

Whereas, the spray bottle of the present invention can administer controlled spray volumes from a squeeze type bottle so as to eliminate the possibility of interference from a user's hands with the spraying operation. Further a user would have the ability to select a given volume of fluid within the bottle for spraying prior to each operation.

SUMMARY OF THE PRESENT INVENTION

A spray bottle in accordance with the present invention comprises a resilient transparent bottle with a removable top, a spray tube having a nozzle on an upper end and an enlarged chamber on a lower end, and a check valve on the bottom of the chamber. The chamber is slidingly disposed within a slide cavity in the top member with the spray tube extending through an upper aperture thereon. The chamber is filled with a desired volume of fluid by pushing down on the spray tube so as to immerse the chamber to a selected depth within the fluid residing in a lower portion of the bottle, wherein the downward displacement of the chamber opens the check valve. The fluid in the chamber is discharged through the nozzle by first retracting the spray tube so as to space the chamber from the surface of the liquid in the bottle, and subsequently squeezing the bottle so as to force air through the check valve and send fluid up the spray tube. A directional sealing ring is further provided around the chamber to allow the ingress of air into the bottle upon an upward displacement of the chamber.

It is thus a main object of the present invention to provide a spray bottle of novel structure which enables a user to select a desired volume of liquid for spraying.

Further objects and advantages of the present invention will become readily apparent after reference is made to a preferred embodiment thereof that is provided below along with accompanying drawings.

DETAILED DESCRIPTION OF THE PREFERRED EMBODIMENT

Figure 1:
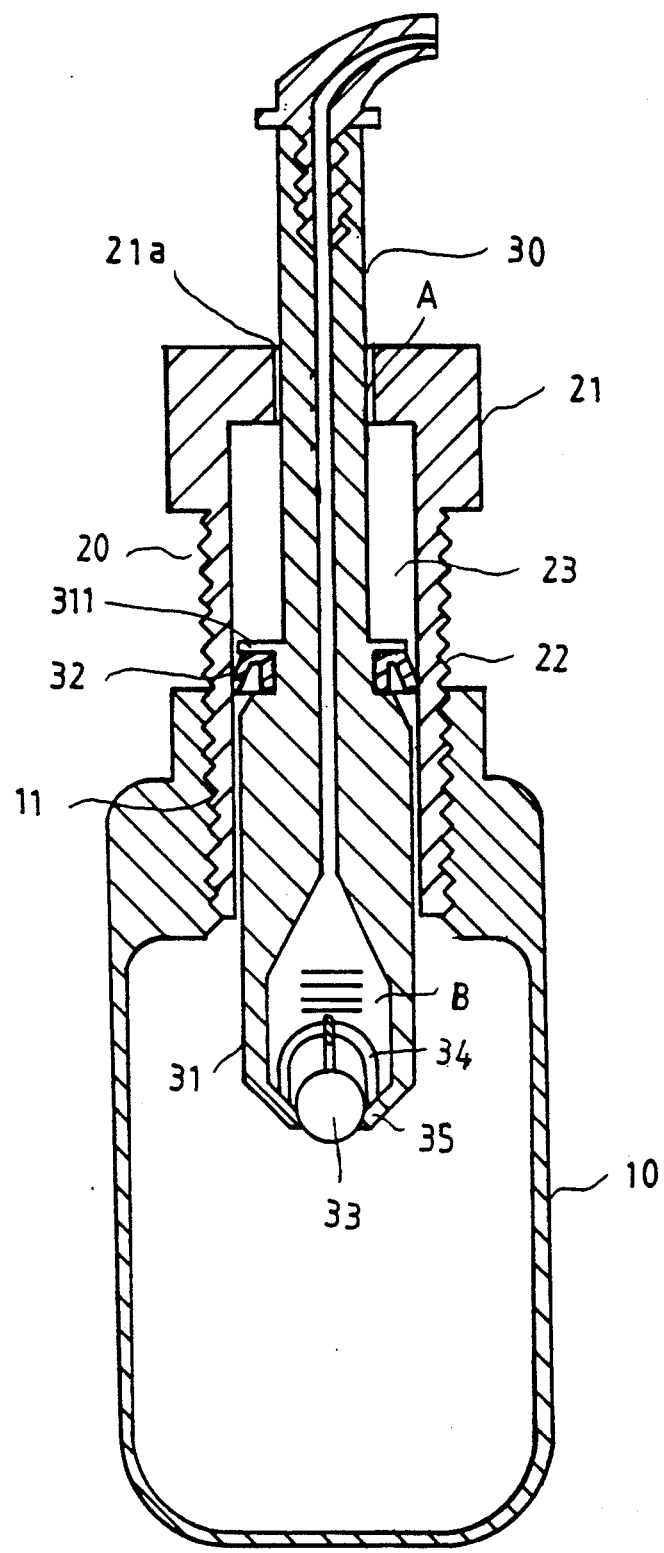
FIG. 1 is a sectional view showing the spray bottle of the present invention.

Referring to FIG. 1 of the drawings, the spray bottle of the present invention comprises a resilient bottle 10 of a transparent synthetic material, a removable top 20 threadedly secured to a top portion of the bottle, and a spray tube 30 with an enlarged chamber 31 formed on the lower end thereof.

Top 20 has an upper bonnet 21 and a threaded shaft 22 depending therefrom which engages mating threads of an opening 11 in the bottle. The length of shaft 22 is considerably greater than the depth of opening 11, wherein the threads thereon are in full engagement with mating threads on the shaft even when bonnet 21 is spaced from the bottle so as to provide a sufficient gas seal when so positioned. A cylindrical slide cavity 23 is formed within shaft 22 and leads to an aperture 21a penetrating the top surface of the bonnet.

Chamber 31 is slidingly disposed within the cavity 23 with the tube 30 extending through aperture 21a and defining a small gap A therebetween (shown greatly exaggerated in FIG. 1) for allowing the passage of air. A similar gap is defined between the chamber and the inner periphery of the cavity. The chamber 31 has an annular, projecting stop 311 on the upper end thereof which limits the upward travel of the chamber within cavity 23.

A directional sealing ring 32 of an elastomeric material disposed around the chamber below stop 311 has a beveled outer periphery and a circumferentially grooved underside so as to define sections roughly of an inverted V shape.

A cavity B within the chamber has a tapering, funnel shaped upper portion that adjoins with the conduit of tube 30. Radial ruling marks formed around the linear lower portion of chamber 31 which also is transparent enable the filling of a desired volume of liquid therein as viewed through the walls of the bottle. A sphere 33 of slightly higher density than an ejective fluid stored in the bottle is disposed within a cage 34 in the lower end portion of the chamber and normally rests against a conformingly shaped annular valve seat 35 therebelow to define a check valve.

Figure 2:
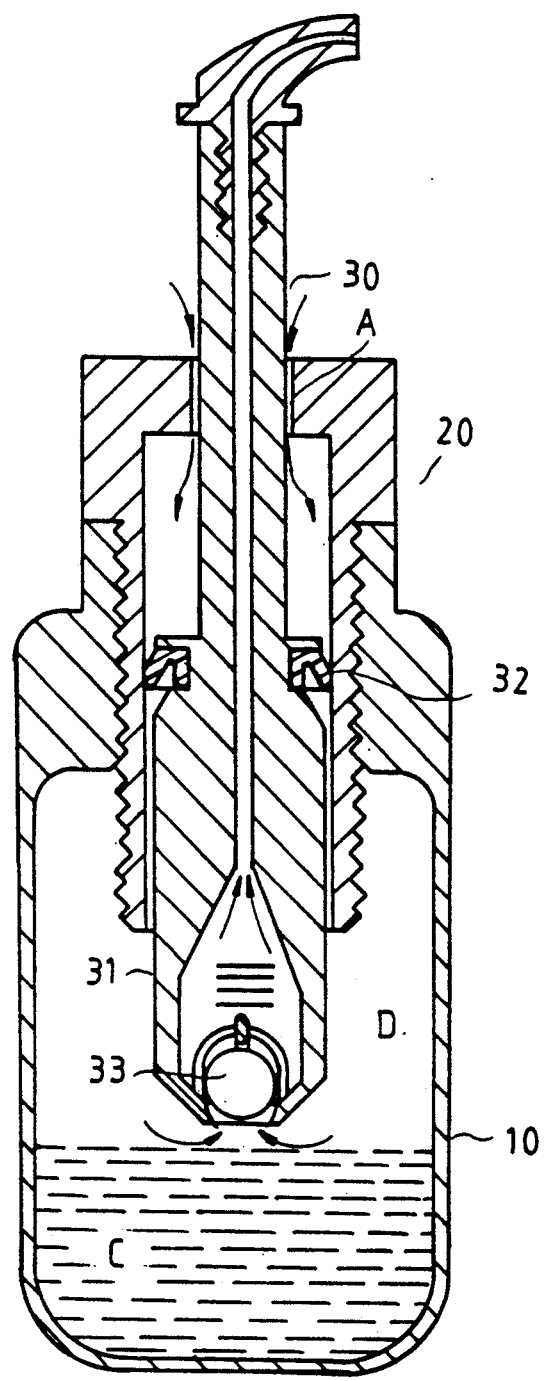
FIG. 2 is a sectional view showing a sprayer tube with an adjoining chamber being pushed downward into the bottle.

In operation, a lower portion of the bottle is filled with an ejective fluid C, as shown in FIG. 2, so as to define an air filled space D above the surface thereof. The tube 30 and chamber 31 are then displaced downwardly, wherein the downward displacement of the chamber compresses the air in space D and opens the check valve by moving sphere 33 away from the valve seat. The displaced air in the chamber is then evacuated through the spray tube. Sealing ring 32 is expanded against the inner periphery of cavity 23 by the air pressure acting within the groove of the ring to prevent air from passing through the gap between the chamber and slide cavity. Concomitantly, air is drawn into the increasing space of an upper portion of cavity 23 above the descending chamber through gap A.

Figure 3:
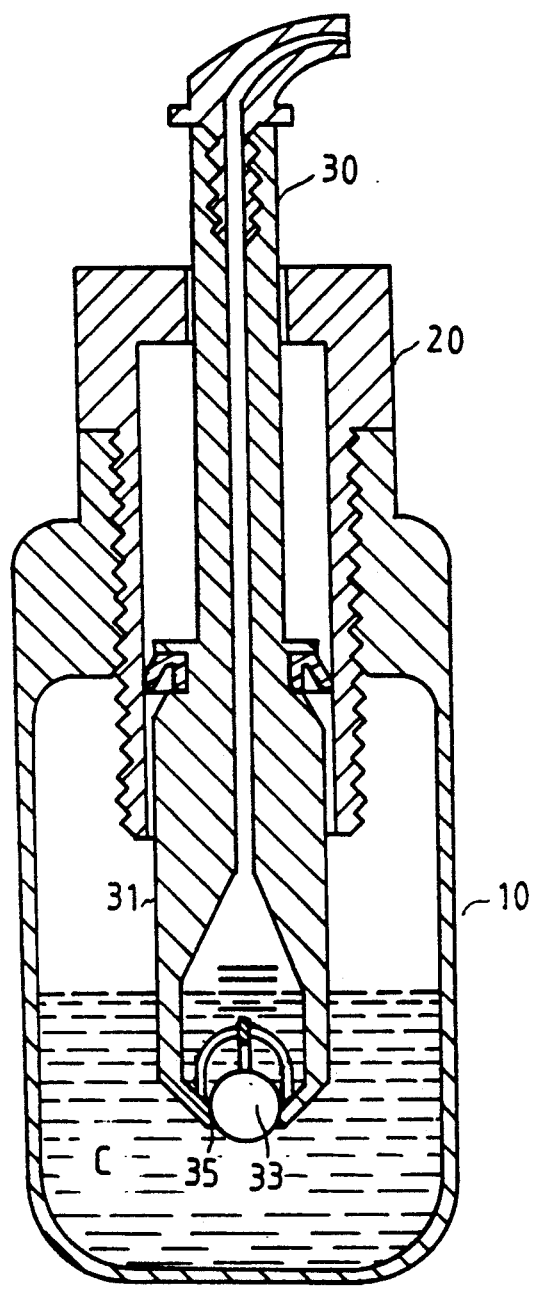
FIG. 3 is sectional view showing the chamber on the lower end of the sprayer tube immersed in a liquid in a lower portion of the bottle.

Referring to FIG. 3, the spray tube is further pushed downwards until the chamber 31 is immersed to a desired depth within the fluid, as determined by viewing the ruling marks therein. The fluid enters the cavity C within the chamber via the check valve which closes, i.e. sphere 33 returns to seat 35, when the descent of the chamber is halted and the fluid pressure above and below the sphere is nearly equal.

Figure 4:
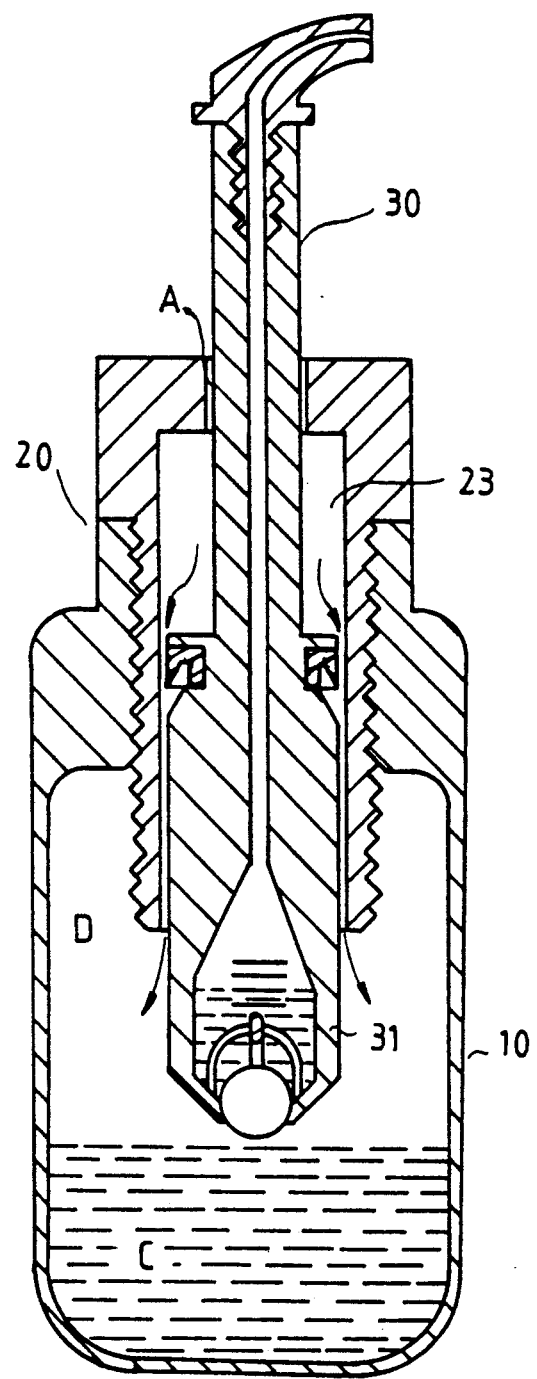
FIG. 4 is sectional view showing the chamber being retracted from the fluid.

The chamber 31 is then retracted from the fluid C, having a selected volume of fluid trapped in the cavity thereof, towards a position substantially spaced from the surface of C, with the closure of the check valve preventing any backflow of liquid or air therefrom. Concomitantly, the air pressure in the upper portion of cavity 23 above the ascending chamber which is greater than that in space D acts to compress the beveled periphery of sealing ring 32 away from the inner periphery of cavity 23, as exaggeratingly shown in FIG. 4. Air can thus flow from cavity 23 to space D via the sealing ring during the upward travel of the chamber.

Figure 5:
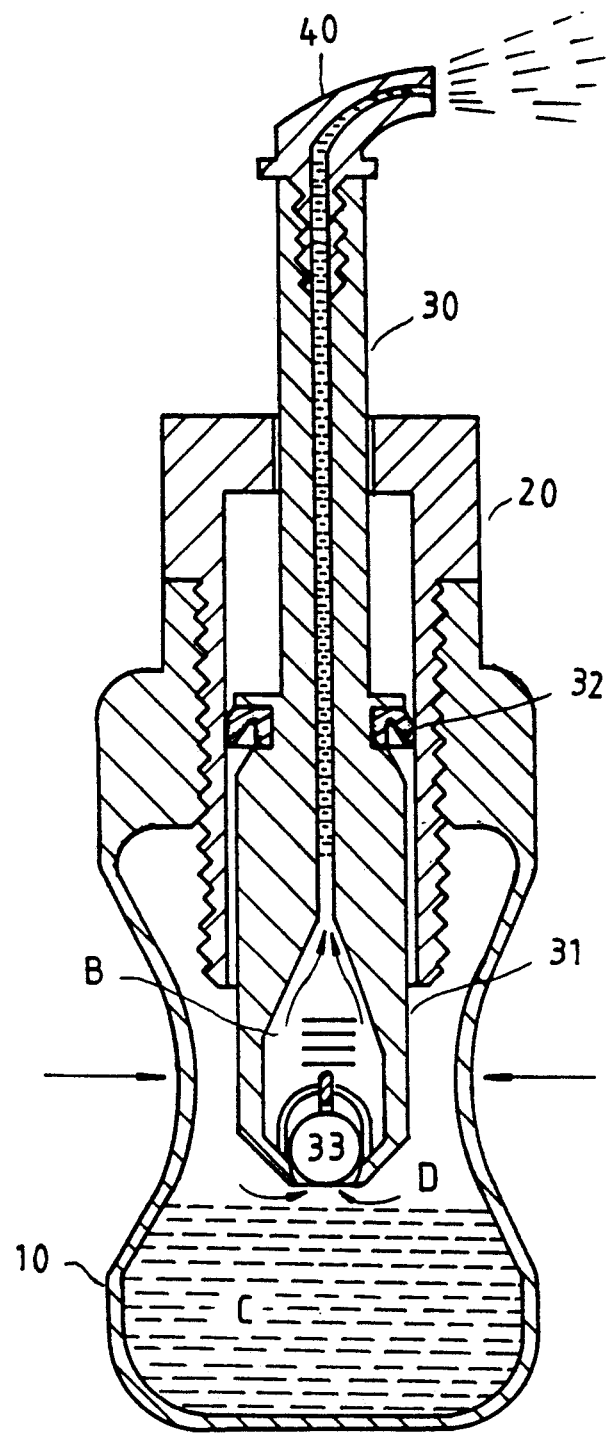
FIG. 5 is a sectional view showing the fluid within the chamber being discharged through an upper nozzle.

The resilient bottle is then manually squeezed, as depicted in FIG. 5, to discharge the fluid in cavity B out of nozzle 40, wherein the sudden rise in pressure in space D opens the check valve in chamber 31 and forces the fluid therein up spray tube 30. Note that sealing ring 32 prevents any bleed of air therethrough during the action. The bottle recovers upon release and sucks air into space D through gap A and sealing ring 32 which permits only a downward flow.

Note also that top 20 can be rotated inwards or outwards of the bottle to adjust for varying amounts of fluid C therein. Initially with the bottle full, the bonnet 21 of the top would be at it's maximum separation from the opening 11, as in FIG. 1, whereas the top would be screwed progressively inward after repeated usages so that the smaller volume of liquid in the bottle remains accessible. Thus, a chamber of lesser length and stroke could be employed in comparison with a spray bottle having a fixed top and slide cavity.

The above disclosure should not be construed in a limitative sense but as being merely exemplary, with many modifications or variations to the present invention being readily attainable by a person of average skill in the art. As such, the spirit and scope of the present invention should not be inferred from the specificities relating to the above embodiment but instead be determined by the appended claims and their legal equivalents:

I claim:

1. A spray bottle comprising:
   a resilient bottle substantially compressible under manual pressure for storing an ejective fluid in a lower portion thereof, wherein an air space is defined within said bottle above a surface layer of the fluid;
   a top portion of said bottle having an elongate slide cavity therein being in communication with said air space in said bottle, and an aperture above said slide cavity in communication therewith;
   an elongate spray tube with an enlarged chamber adjoined on a lower end thereof, said chamber being slidingly disposed in said slide cavity with said spray tube extending through said aperture and defining a gap therebetween;
   a spray nozzle on the upper end of said spray tube;
   a first unidirectional flow control means disposed around an outer periphery of an upper portion of said chamber for inhibiting the flow of air from said air space past said chamber into an upper portion of said slide cavity above said chamber upon a downward displacement thereof wherein air is drawn into the upper portion of said slide cavity through the gap between the aperture and said tube, and for enabling the flow of air from the upper portion of said slide cavity past said chamber into said air space upon an upward displacement of said chamber wherein air is expunged from the upper portion of said slide cavity through the gap;
   a second unidirectional flow control means disposed in a lower end portion of said chamber for enabling the flow of air and said fluid into said chamber upon a downward displacement of said chamber through said air space into said fluid in the lower portion of said bottle, and for inhibiting the flow of said fluid from said chamber through said second unidirectional flow control means upon extraction of said chamber from said fluid;
   whereby, said fluid is discharged through said nozzle by first downwardly displacing said tube so as to immerse said chamber into said fluid, raising said tube so as to sufficiently space said chamber from the surface layer of said fluid, and subsequently squeezing said bottle to force said fluid in said chamber upwards through said nozzle via said tube.

2. A spray bottle according to claim 1, wherein said bottle and said chamber are transparent, and said chamber has radial ruling marks formed thereon.

3. A spray bottle according to claim 2, further comprising a removable top member threadedly secured to an opening on a top portion of said bottle with said slide cavity and said aperture being disposed in said top member, wherein said top member is adjustable in position in said opening so as to vary the separation between said chamber and the surface of said liquid.

4. A spray bottle according to claim 3, wherein said top member has a threaded shaft of greater length than the threaded depth of said opening in engagement therewith.

5. A spray bottle according to claim 3, wherein said first unidirectional flow control means comprises an annular member of elastic material having a beveled outer periphery and circumferentially grooved underside, wherein the beveled outer periphery is compressed away from an inner periphery of said slide cavity by air pressure from the upper portion thereof during an upward displacement of said chamber, and expanded against the inner periphery of said slide cavity by air pressure from said air space acting against the grooved underside during a downward displacement of said chamber.

6. A spray bottle according to claim 3, wherein said second unidirectional flow control means comprises a sphere of a density substantially greater than that of said liquid disposed within a cage in a lower portion of said chamber and an annular valve seat disposed below said cage for engagement with said sphere.

* * * * *